United States Patent [19]

Nakamura

[11] Patent Number: 5,365,801
[45] Date of Patent: Nov. 22, 1994

[54] COARSE/FINE ADJUSTMENT OF A ROTARY BODY

[75] Inventor: Kyoji Nakamura, Yokosuka, Japan

[73] Assignee: Nikon Corporation, Tokyo, Japan

[21] Appl. No.: 25,567

[22] Filed: Mar. 3, 1993

[30] Foreign Application Priority Data

Mar. 5, 1992 [JP] Japan .................................. 4-083219

[51] Int. Cl.⁵ .............................................. F16H 1/16
[52] U.S. Cl. ........................... 74/425; 74/10.5;
74/810.1; 108/139; 359/392; 359/394
[58] Field of Search ................ 74/10.5, 89.14, 425,
74/810.1; 108/139; 359/392, 394

[56] References Cited

U.S. PATENT DOCUMENTS 2,914,952 12/1959 Frischmann .................... 74/10.5
3,019,707 2/1962 Straat ........................ 74/10.5 X

FOREIGN PATENT DOCUMENTS 1-34151 2/1983 Japan .
3-23524 2/1985 Japan .

Primary Examiner—Allan D. Herrmann
Attorney, Agent, or Firm—Shapiro and Shapiro

[57] ABSTRACT

A coarse/fine adjustment of a rotary body, comprising: a worm wheel fitted to a rotary shaft of a rotary body; a worm meshing with the worm wheel and having a first screw; a rotary driving shaft having a second screw engaging with the first screw and rotated by a manipulation member and a switching means for effecting a switchover to rotationally or rectilinearly move the worm engaging with the rotary driving shaft. The worm is biased by a biasing means to mesh with the worm wheel while keeping a thrust state.

5 Claims, 4 Drawing Sheets

COARSE/FINE ADJUSTMENT OF A ROTARY BODY

BACKGROUND OF THE INVENTION

1. Field of the Invention

The present invention relates generally to a coarse/fine adjustment of a rotary body and, more particularly, to a coarse/fine adjustment capable of coarsely finely adjusting a turn table or the like of a collimation telescope of a surveying instrument and a microscope by use of a single piece of manipulation knob.

2. Related Background Art

The conventional technology will be explained by exemplifying a surveying instrument.

The conventional surveying instrument incorporates a variety of fine adjustments into a rotary adjusting mechanism of a horizonal shaft or a perpendicular shaft in order to collimate the telescope with a high precision. The following is a mechanism proposed as a structure of this type of fine adjustment. A micromotion shaft is moved by transforming a rotation of a micromotion knob into a movement in the axial direction of a micromotion shaft. This micromotion shaft thrusts a projection part of a clamped ring attached to a rotary shaft such as a perpendicular shaft or the like of the surveying instrument. Thus, the rotary shaft makes a rotational micromotion (Japanese Utility Model Publication Nos. 1-34151 and 3-23524).

By the way, in those rotary shaft fine adjustments, the telescope is substantially manually directed beforehand to an object for collimation. The rotary shaft of the telescope is clamped in this state. Further, a micromotion of the rotary shaft is thus adjusted. Under such circumstances, a coarse adjustment is mounted in combination when automating the collimation of the telescope of the surveying instrument by driving an electric motor, etc. The fine adjustment is driven after driving the coarse adjustment. It is required that the telescope be collimated under proper motor control.

FIG. 7 is a plan view showing one example of the coarse adjustment described above. Referring to FIG. 7, the numeral 50 indicates a body of the surveying instrument. A rotary shaft 51 is rotatably supported on a rotary shaft bearing 52 substantially in the central position of a cylindrical part 50a of the body 50. A worm wheel 53 is fitted to the outer periphery of a flange 52a formed on this rotary shaft bearing 52.

On the other hand, a worm 54 meshing with this worm wheel 53 is accommodated in a breadth-expanded part 50b extending to assume an angular shape in some portion of the body 50. This worm 54 is tightly fitted to a rotary driving shaft 55 rotatably supported on bearings 154, 154 fixed to the side surfaces of the breadth-expanded part 50 b. Coarse motion knobs 56, 56 are secured to both ends of the rotary driving shaft 55. The rotary shaft 51 can be coarsely rotated in predetermined directions by turning the coarse knobs 56 forward or reversely.

A ratio of turn of the coarse knob to an angle of coarse rotation of the rotary shaft 51 can be set to a variety of values depending on a lead value of the worm 54 and a diameter of the worm wheel.

Incidentally, when employing a worm mechanism for driving under the motor control to collimate the telescope, it is impossible to set the screw lead of the worm to an infinitesimal width in terms of a working accuracy. Sufficient resolving power of the driving motor connected to the rotary driving shaft can not be drawn out. This results in such a problem that a collimating precision of the telescope declines.

Further, if the worm lead is set to the infinitesimal width, there arises an inconvenience in which the rotation knob has to be turned a considerable number of times when largely deflecting the telescope.

In this case, the fine adjustment described above is incorporated together with the coarse adjustment. The telescope can be also collimated by a combinational operation of the two adjustments. However, a plurality of mechanisms are accommodated in an interior of the body. Moreover, motors for driving these mechanisms are mounted. Consequently, the surveying instrument increases in size enough not to meet the user's demands for miniaturization as well as for a high performance.

SUMMARY OF THE INVENTION

It is a primary object of the present invention to provide a coarse/fine adjustment capable of coarsely finely adjusting a rotary shaft of a rotary body with a simple construction.

To accomplish the object given above, according to one aspect of the present invention, there is provided a coarse/fine adjustment of a rotary body, comprising: a worm wheel fitted to a rotary shaft of a rotary body; a worm meshing with the worm wheel and having a first screw: a rotary driving shaft having a second screw engaging with the first screw and rotated by a manipulation member and a switching means for effecting a switchover to rotationally or rectilinearly move the worm engaging with the rotary driving shaft.

Hereat, the worm is biased by a biasing means to mesh with the worm wheel while keeping a thrust state.

As described above, according to the present invention, it is possible to obtain an easy-to-operate and compact coarse/fine adjustment of a rotary body, wherein the rotary shaft attached to the work wheel can be coarsely finely rotated by a single length of rotary driving shaft.

Further, the worm is biased by the biasing means to mesh with the worm while keeping the thrust state. It is therefore feasible to surely produce a friction between the worm and the worm wheel.

Moreover, according to the present invention, the rotary shaft of the rotary body can be coarsely finely adjusted with a simple structure. The present invention exhibits an effect of providing a large contribution to automate a motor-controlled rotation adjustment of a turn table and a collimation mechanism of the rotary body.

BRIEF DESCRIPTION OF THE DRAWINGS

Other objects and advantages of the present invention will become apparent during the following description in conjunction with the accompanying drawings, in which.

DESCRIPTION OF THE PREFERRED EMBODIMENTS

A coarse/fine adjustment of a surveying instrument as an embodiment of the present invention will hereafter be described with reference to FIGS. 1 through 4.

Figure 1:
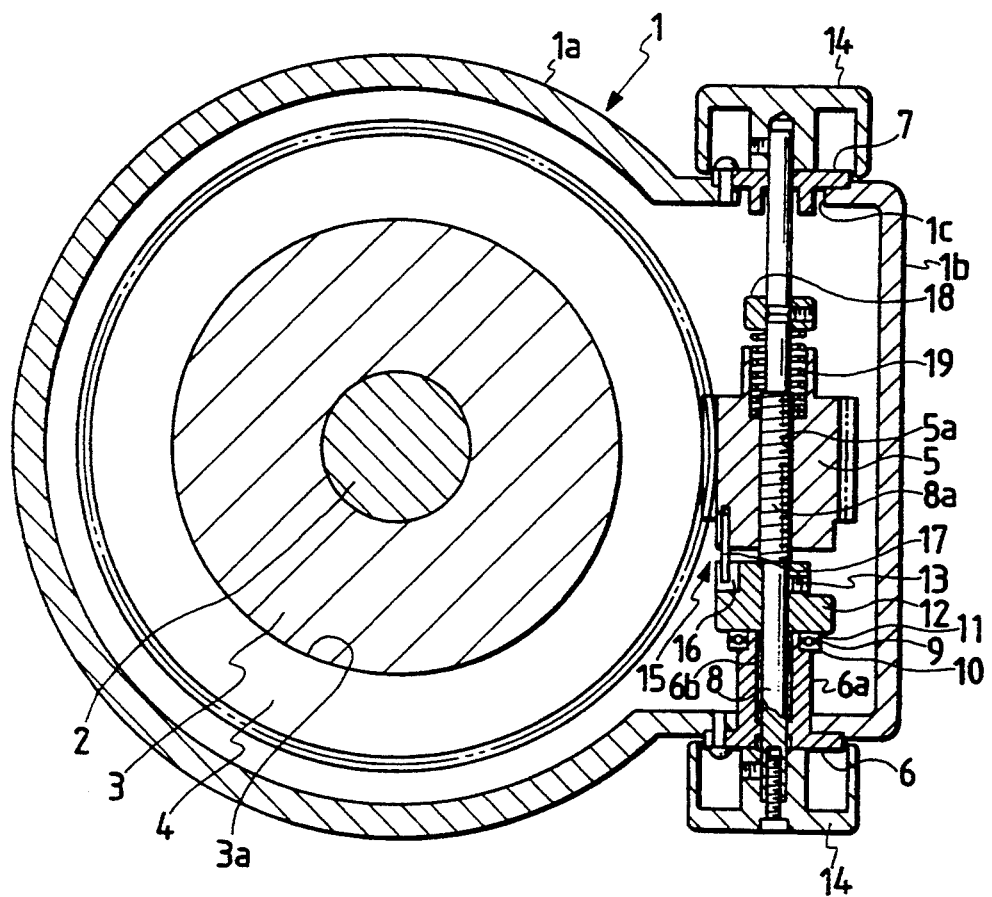
FIG. 1 is a sectional plan view showing a coarse/fine adjustment of a surveying instrument as an embodiment of the according to the present invention.

FIG. 1 is a plan view showing one example of the coarse/fine adjustment of this invention. Referring to FIG. 1, a surveying instrument body 1 has a cylindrical part 1a. Substantially at the central position of the cylindrical part 1a of this body, a rotary shaft 2 is rotatably supported on an unillustrated rotary shaft bearing. Further, a worm wheel 4 is fitted to an outer periphery of an annular flange 3 formed on this rotary shaft bearing.

On the other hand, a worm 5 meshing with this worm wheel 4 is accommodated in a breadth-expanded part 1b projecting in an angular shape in some portion of the body. Openings 1c confronting each other are formed in side surfaces of this breadth-expanded part 1b. Bearings 6, 7 are secured to the openings 1c. Further, a rotary driving shaft 8 is rotatably supported on these bearings 6, 7.

The bearing 6 is also formed with a cylindrical part 6a in which the rotation driving shaft 8 is loosely fitted. A bearing surface 6b is formed on the end surface of this cylindrical part 6a. A web washer 9 is sandwiched in between a pair of Teflon washers 10, 11 mounted on the bearing surface 6b. Further, a substantially cylindrical stopper 12 is tightly fitted to the rotary driving shaft 8 through a fitting screw 13 on the side of the Teflon washer 11.

Rotation knobs (Manipulation Members) 14, 14 for rotary driving shaft 8 are also attached to both ends of the rotary driving shaft 8.

Moreover, the peripheral surface of the rotary driving shaft 8 at the substantially central location is threaded from the vicinity of the stopper 12, thus forming a feed screw part 8a. On the other hand, a thread 5a (first screw) having the same pitch as that of the feed screw part 8a (second screw) is cut in the inner peripheral surface of the worm 5. The worm 5 is thereby rotatably engaged with the feed screw part 8a of the driving shaft 8.

Note that the feed screw having a lead of 0.5 mm is cut in the surface of the rotary driving shaft 8 in this embodiment, however, a ball screw may be engaged with this portion. Further, the leads of the worm wheel and of the feed screw are set to predetermined values, whereby a variety of coarse-to-fine rotation ratios can be, as a matter of course, set.

Here, a lock part (switching means) 15 is formed between the stopper 12 described above and the end surface of the worm 5. A clutch mechanism is constructed to function between the worm 5 and the rotary driving shaft 8 by connecting and disconnecting this lock part 15.

This lock part 15 consists of a lever 16 formed on the stopper 12 and a lock pin 17 protruding from the end surface of the worm 5. Particulars of the construction and operation thereof will be explained later.

Further, a spring stopper 18 is fixed to the rotary driving shaft 8 on the side opposite to the end surface, fitted with the lock pin 17, of the worm 5. A coil spring 19 is accommodated between the spring stopper 18 and the end surface of the worm 5. This coil spring 19 biases the worm 5 toward the stopper 12. The tooth surface of the worm 5 is thereby forced to tightly mesh with the tooth surface of the worm wheel 4. This results in a generation of a large frictional force. At this time, a slide friction between the tooth surfaces when the meshing portions of the worm 5 and of the worm wheel 4 rotate in contact with each other is larger than a rotational friction of the worm 5 with the feed screw 8a.

Herein, the construction of the clutch mechanism of the lock part 15 will be explained with reference to FIGS. 2A, 2B, 3A and 3B.

Figure 2A:
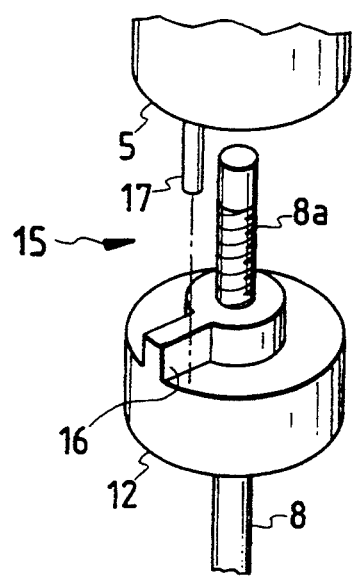
FIGS. 2A and 2B are partially enlarged perspective views each illustrating a lock part shown in FIG. 1.

FIG. 2A illustrates the stopper 12 fixed to the rotary driving shaft 8. The lever 16 integral with the body of the stopper 12 is so formed on the surface of this stopper 12 as to extend in the radial direction from the rotary driving shaft 8. On the other hand, the pin 17 assuming a small bar-like configuration projects from the end surface of the worm 5 that faces to this lever 16. This lock pin 17 and the lever 16 are normally in a state shown in FIG. 2B. When rotating the rotary driving shaft 8 in an arrowed direction A from this state, the lever 16 impinges on the lock pin 17. The worm 5 is also thereby rotated integrally with the rotation of the rotary driving shaft 8.

Figure 3A:
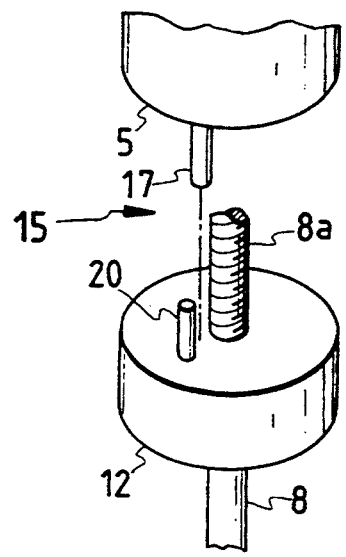
FIGS. 3A and 3B are partially enlarged perspective views each showing an example of variant form of the lock part shown in FIG. 2.
Figure 3B:
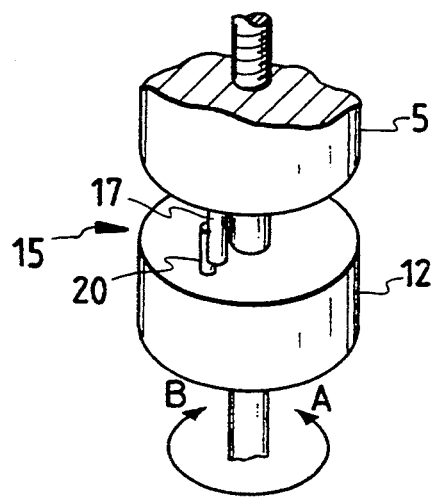

FIGS. 3A and 3B illustrate examples of variant form in which a lock pin 20 taking the same configuration as that of the lock pin 17 of the worm 5 is also protruded from the stopper 12 instead of forming the lever 16. In this case also, the lock pin 17 of the stopper 12 impinges on the lock pin 20 of the worm 5 by rotating the rotary driving shaft 8 in the arrowed direction A. With the rotation of the rotary driving shaft 8, the worm 5 is thereby rotated integrally with the stopper 12, i.e., the rotary driving shaft 8.

Figure 2B:
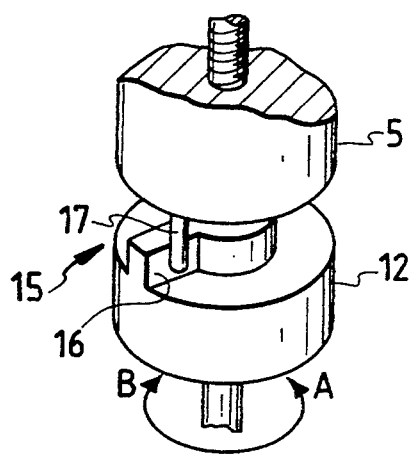

The following is an explanation of a case where the rotary driving shaft 8 is rotated in an arrowed direction B shown in FIGS. 2B and 3B.

When rotating the rotary driving shaft 8 in the arrowed direction B, the lock part 15 of the clutch mechanism is disconnected. The rotation of the feed screw part 8a is transmitted directly to the worm 5. At this moment, the slide friction between the meshing portions of the worm 5 and of the worm wheel 4 is greater than the rotational friction of the worm 5 with the feed screw part 8a. Hence, the worm 5 itself does not co-rotate with the feed screw part 8a. The worm 5 undergoes a thrust force and is thereby finely fed in the axial direction of the rotary driving shaft 8. With this micro-motion, the worm wheel 4 engaging with the worm 5 is also finely rotated. The rotational micromotion of the rotary shaft is thus attained.

Based on this construction, the rotating direction of the worm wheel 4 changes depending on the arrowed directions A and B in which the rotary driving shaft 8 is rotated. However, setting of the lead directions of the worm wheel and of the feed screw is changed. It is thus possible to set the worm wheel 4 in the same rotating direction even when rotating the rotary driving shaft 8 in the arrowed direction A or B.

Incidentally, in the example shown in FIG. 2B, the feed screw part 8a is rotated in the arrowed direction A, while the worm 5 is finely fed in the direction opposite to the above-mentioned one. This may be fulfilled by causing the rotary driving shaft 5 to run idle with substantially one revolution finely and feebly and impinging the lever 16 on the lock pin 17 from the opposite side to that illustrated in the Figure.

Next, there will be explained an example where the coarse/fine adjustment according to the present invention is applied to a rotation adjusting mechanism of a perpendicular shaft of the surveying instrument with reference to FIG. 4.

Figure 4:
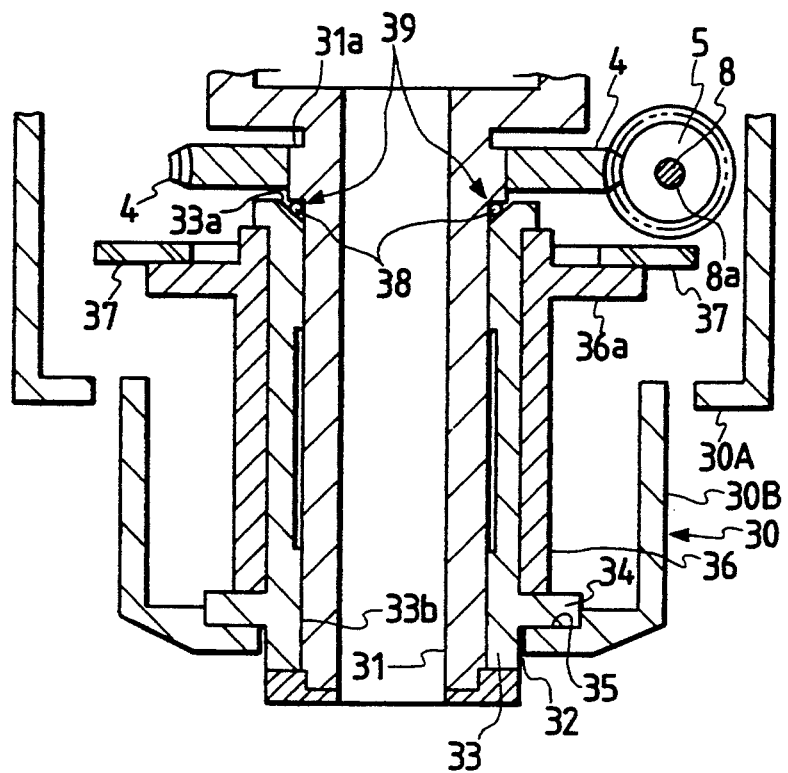
FIG. 4 is a cross-sectional view showing an example where the coarse/fine adjustment of the present invention is applied to a perpendicular shaft of a surveying instrument.

FIG. 4 is a partially enlarged view of a perpendicular shaft 31 of a surveying instrument 30. Referring to FIG. 4, the symbol 30A represents a side cover of the surveying instrument body. A dust-proof cover designated by 30B prevents dusts from entering an interior of the surveying instrument by coming into contact with the side cover 30A. A circular opening 32 is formed in the lower end portion of this dust-proof cover 30B. Further, an annular flange 34 is formed at the lower end portion of a perpendicular bearing 33 disposed to penetrate the opening 32. This flange 34 is fixed to a shoulder part 35 formed along an opening peripheral portion of the dust-proof cover 30B, thereby closing the circular opening 32.

Moreover, a horizontal scale panel support shaft 36 is attached to the outer periphery of the perpendicular bearing 33 so that the lower end contacts the upper surface of the annular flange 34. An annular scale panel support flange 36a mounted with a horizontal scale panel 37 is formed at the upper portion of the horizontal scale panel support shaft 36.

On the other hand, a tapered ball race surface 33a is formed in the upper end portion of the perpendicular bearing 33. Steel balls 38 are accommodated in an air space defined by this race surface 33a and the lower surface of a support flange 31a formed along the peripheral surface of the perpendicular shaft 31. A ball bearing 39 is thus configured. The perpendicular shaft 31 is rotatably supported on this ball bearing 39 in perpendicular direction thereof. The perpendicular shaft 31 is supported over the entire surface of an inner peripheral surface 33b of the cylindrical perpendicular bearing 33 in the rotating direction. A runout is thereby prevented during the rotation. A rotational accuracy is thus held.

On the other hand, the worm wheel 4 is tightly fitted to the outer peripheral surface of the support flange 31a. The worm 5 is rotatably fitted to the feed screw part 8a of the rotary driving shaft 8 so that the worm 5 meshes with the worm wheel 4. At this time, the worm 5 is biased toward the stopper by the coil spring as in the case shown in FIG. 1. The clutch mechanism is incorporated therein and is therefore connectable and disconnectable by turning a rotation knob.

In accordance with the embodiment discussed above, the coarse/fine rotations of the perpendicular shaft of the surveying instrument are attainable with the coarse/fine adjustment according to this invention. This coarse/fine adjustment is applied in combination to a horizontal shaft for supporting a telescope of the surveying instrument. It is thus feasible to highly facilitate collimation of the telescope.

Next, an example where the above-mentioned coarse/fine adjustment is applied to a turn table mounted with a sample or the like of a microscope will be described by way of another embodiment with reference to FIG. 5.

Figure 5:
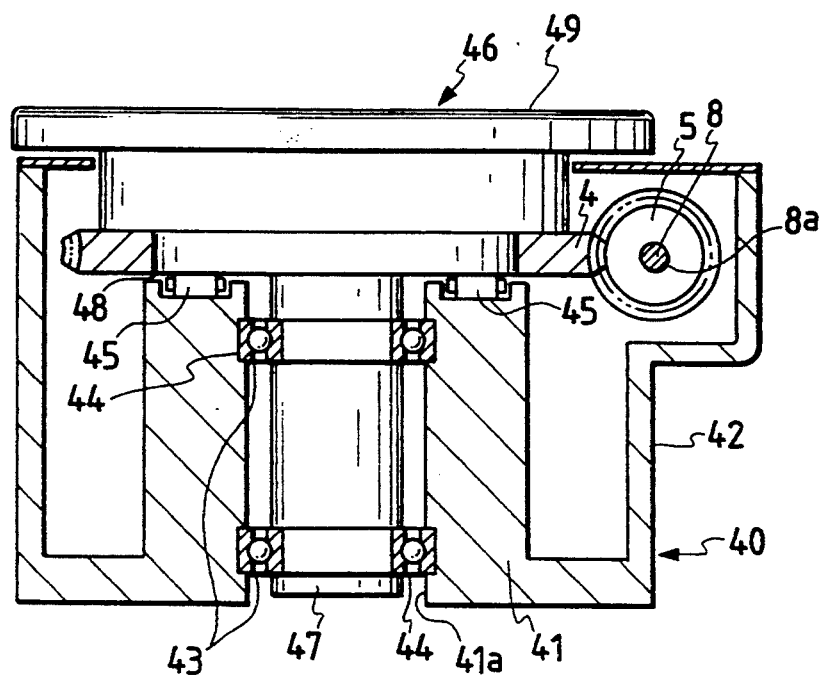
FIG. 5 is a cross-sectional view showing an example where the coarse/fine adjustment of the present invention is applied to a rotary shaft of a turn table of a microscope.

Referring to FIG. 5, a support frame 40 of the turn table is constructed of a bearing bracket 41 and a frame side cover 42. The bearing bracket 41 assuming a thick cylindrical configuration is formed in the central position thereof. The frame side cover 42 is formed integrally with this bearing bracket 41. Angular grooves 43 are cut in upper and lower locations of an inner peripheral surface 41a of the bearing bracket 41 thereof. Ball bearings 44, 44 are each fitted in these angular grooves 43.

On the other hand, needle bearings 45 are disposed at predetermined spacings on the upper end surface of the bearing bracket 41. The turn table 46 is supported on the ball bearing 44 and the needle bearings 45 as well. More specifically, a rotary shaft 47 of the turn table 46 is rotatably supported on the ball bearings 44. At the same time, a bottom surface 48 of the turn table 46 is supported on the needle bearings 45. A sample mounting board 49 having a relatively large area is rotatable while holding the horizontal plane.

Hereat, the worm wheel 4 is fitted in stepped portions formed in the turn table 46. Further, the worm 5 engaging with the feed screw part 8a of the rotary driving shaft 8 meshes with the worm wheel 4. This worm 5 is constructed absolutely in the same manner as that in the coarse/fine adjustment described above. An observer is able to make coarse/fine rotational adjustments of the sample board on the turn table in a predetermined direction by turning the rotation knob.

Besides, the coarse/fine adjustment can be incorporated into an apparatus required to coarsely finely adjust a position of the workpiece as in an index head of a machine tool.

Note that the biasing means, stated in the foregoing embodiments, for increasing the slide friction between the worm and the worm wheel may adopt such an arrangement that the worm wheel takes a scissors mechanism in place of the coil spring, and this scissors mechanism catches a thread of the worm to increase a frictional resistance when engaged.

Further, a gear train may be secured to the rotary driving shaft, and the rotary driving shaft may be driven by a motor. In this instance, positional signals from a position detecting part are fed back to make forward-/reverse rotations of the motor. Proper coarse/fine control of the rotary shaft is conducted. Collimating and locating can be also automated. In this case, preferably motor driving and a manual operation are properly switched over by providing the gear train with a clutch mechanism.

Figure 6:
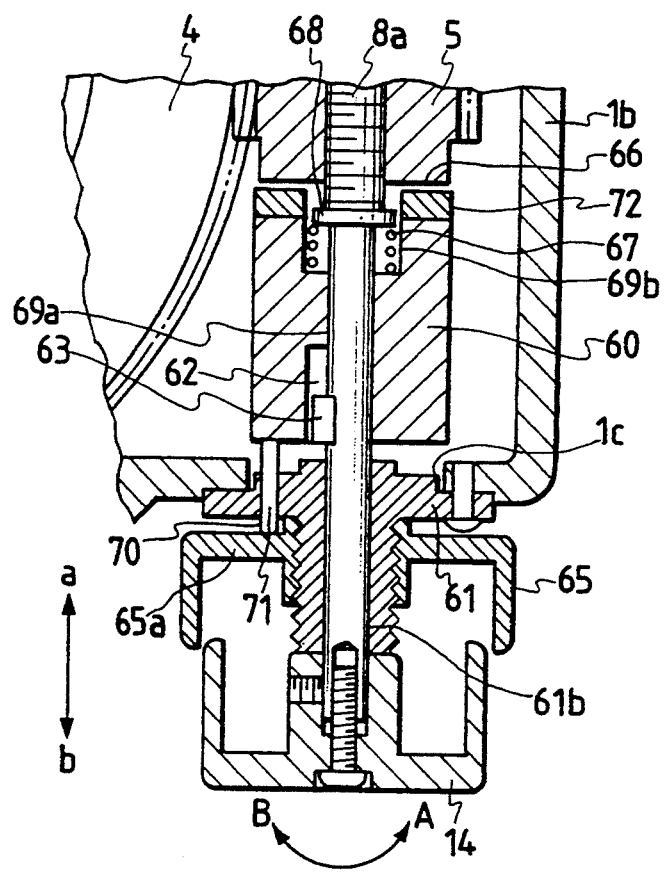
FIG. 6 is a partially enlarged sectional view showing a modification of the lock part according to the present invention.
Figure 7:
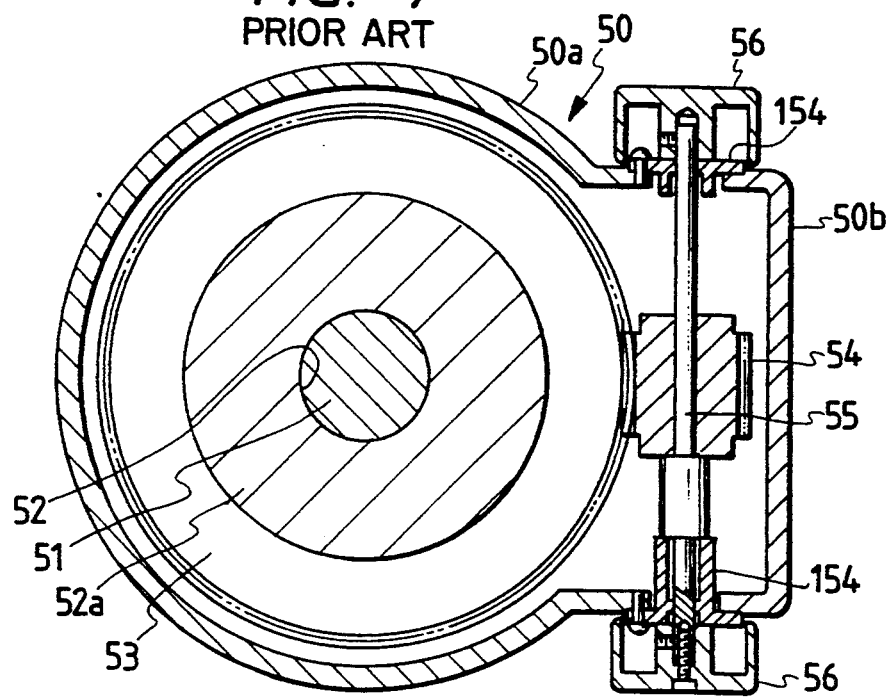
FIG. 7 is a sectional plan view showing one example of a conventional coarse/fine adjustment of a surveying instrument.

The lock part 15 in this embodiment is constructed of the lever 16 of the stopper 12 and the lock pin 17 projecting from the end surface of the worm 5. The lock part 15 may be, however, composed of another lock part as shown in FIG. 6. Note that the same constructive parts as those in FIG. 1 are marked with the like symbols, and the description thereof will be omitted.

As illustrated in FIG. 6, a bearing 61 is mounted in an opening 1c formed in the side surface of the breadth-expanded part 1b of the surveying instrument body. The rotary driving shaft 8 having its end surface fitted with a rotation knob 14 is rotatably supported in this bearing 61. The bearing 61 is also formed with a male screw part 61b extending in the axial direction of the rotary driving shaft 8 fitted with the rotation knob 14. Further, the bearing 61 has a through-hole 70 formed in the axial direction of the rotary driving shaft 8.

A spring stopper 68 fixed between the worm 5 and a coarse/fine switching ring 60 is disposed on the rotary driving shaft 8. A spring 67 is provided between the spring stopper 68 and the bottom surface of a recess 69b of the coarse/fine switching ring 60.

A doughnut-like friction disc 72 is fixed to a surface of the coarse/fine switching ring 60 that confronts the end surface 66 of the worm 5. A minor diameter of this friction disc 72 is equal to or larger than that of the recess 69b.

A key way 62 is formed between the coarse/fine switching ring 60 and the rotary driving shaft 8. A key is fitted in this key way 62.

Hence, it follows that the coarse/fine switching ring 60 does not rotate about the rotary driving shaft 8 but is movable only in the axial direction of the rotary driving shaft.

A switching knob 65 engages with the male screw part 61b of the bearing 61 so as to be disposed between the surveying instrument body and the rotation knob 14.

Moreover, a pin 71 is so provided in the through-hole 70 formed in the bearing 61 as to be movable in the axial direction of the rotary driving shaft 8. The pin 71 is provided in such a way that one end of this pin 71 impinges on the coarse/fine switching ring 60, while the other end of the pin 71 impinges on a switching handle 65a of switching knob 65.

The thus constructed lock part works to, when turning the switching knob 65 in a direction A, for example, to move the switching knob 65 along the male threaded part 61b of bearing 61, and thereby move the coarse/fine switching ring 60 in an axial direction a through the pin 71. The friction disc 72 of the coarse/fine switching ring 60 is thereby allowed to impinge on the end surface 66 of the worm 5. Accordingly, the rotation knob 14 is turned in one direction, whereby the rotation driving shaft 8 rotates the coarse/fine switching ring 60 fitted thereto through the key. Simultaneously, the worm 5 integrally rotates through the friction disc 72. Namely, the rotary driving shaft 8 and the worm can be integrally rotated.

Note that the frictional force of the friction disc 72 is required enough to rotate the worm wheel 4 through the worm 5 by impinging the friction disc on the worm 5.

Reversely when rotating the coarse/fine rotation knob 65 in a direction B, the coarse/fine switching ring 60 is moved in a direction b by the biasing force of the spring 67. It follows then that the friction disc 72 of the coarse/fine switching ring 60 is disconnected from the end surface 66 of the worm 5.

Hence, when rotating the rotation knob 14 in the same direction as the one during the integral rotation, it follows that the rotation of the feed screw part 8a is transmitted directly to the worm 5. At this time, the slide friction between the meshing portions of the worm 5 and the worm wheel 4 is larger than the rotational friction of the worm 5 with the feed screw part 8a. Therefore, the worm 5 itself does not co-rotate with the feed screw part 8a. The worm 5 undergoes the thrust force and is therefore finely fed in the axial direction of the rotary driving shaft 8. With this micromotion, the worm wheel 4 meshing with the worm 5 is also finely rotated. The rotational micromotion of the rotary shaft is thus attained.

It is apparent that, in this invention, a wide range of different working modes can be formed based on the invention without deviating from the spirit and scope of the invention. This invention is not restricted by its specific working modes except being limited by the appended claims.

What is claimed is:

1. A coarse/fine adjustment of a rotary body, comprising:
   a worm wheel fitted to a rotary shaft of said rotary body;
   a worm meshing with said worm wheel and having a first screw;
   a rotary driving shaft having a second screw engaging with said first screw;
   a manipulation member for rotating said rotary driving shaft; and
   switching means having first and second switching modes,
   wherein said switching means integrally connects said rotary driving shaft to said worm and rotates said worm by transmitting a rotation of said rotary driving shaft directly to said worm in said first switching mode, and transforms the rotation of said rotary driving shaft into a rectilinear movement through said first screw engaging with said second screw in said second switching mode.

2. The coarse/fine adjustment of the rotary body according to claim 1, wherein said rotary body is coarsely rotated in said first switching mode but finely rotated in said second switching mode.

3. The coarse/fine adjustment of the rotary body according to claim 1, wherein the coarse rotation of said rotary body is performed by rotating said rotary driving shaft in one direction through said manipulation member, and the fine rotation of said rotary body is conducted by rotating said rotary driving shaft in a reverse direction through said manipulation member.

4. The coarse/fine adjustment of the rotary body according to claim 1, wherein said switching means is constructed of a protruded lock part formed on said rotary driving shaft and a projection part locked in said protruded lock part, the rotational center of said rotary driving shaft coincides with that of said worm, said projection part is locked in said protruded lock part by rotating said rotary driving shaft in one direction in said first switching mode, the rotation of said rotary driving shaft is transmitted directly to said worm to rotate said worm, said projection part is disconnected from said protruded lock part by rotating said rotary driving shaft in a reverse direction in said second switching mode, and said worm is rectilinearly moved with the rotation of said rotary driving shaft.

5. The coarse/fine adjustment of the rotary body according to claim 1, further comprising a biasing means for biasing said worm in the axial direction of said rotary driving shaft to thrust said worm against said worm wheel.

* * * * *